Figure 1:
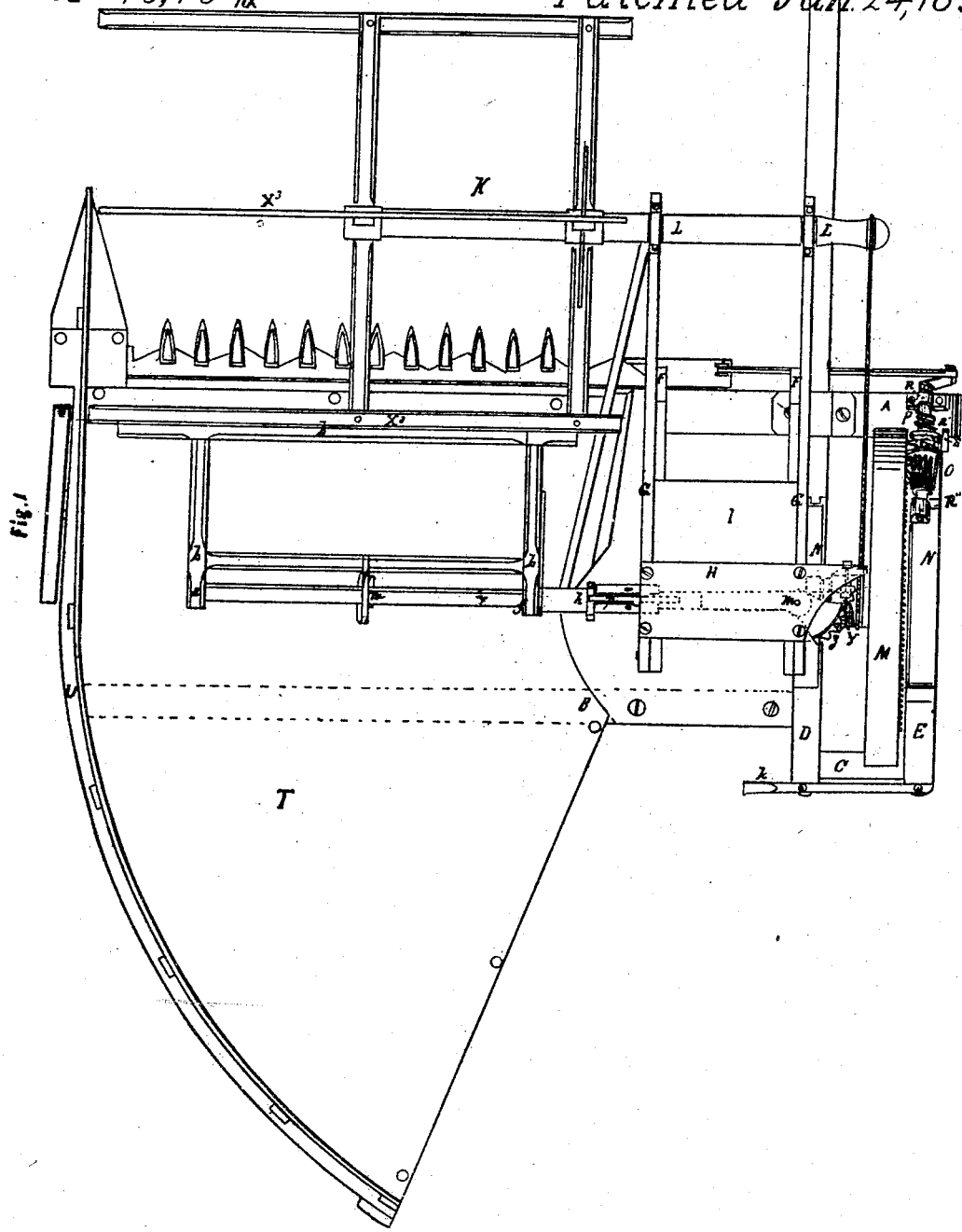
Figure 2:
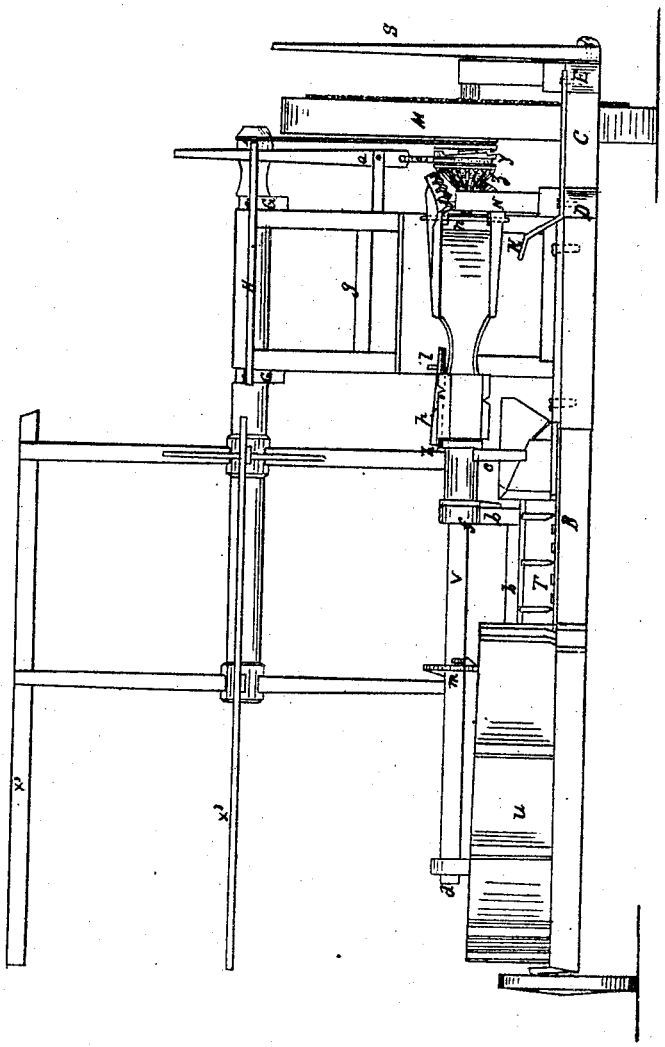
Figure 3:
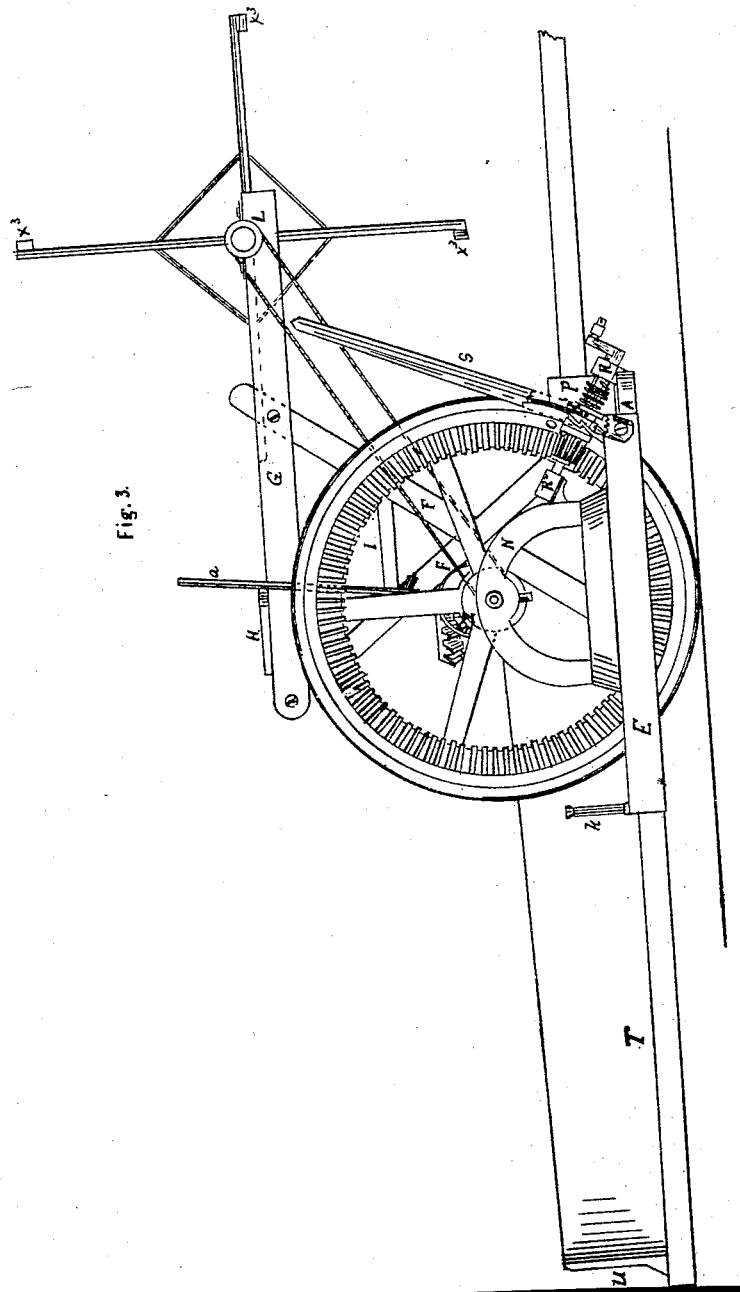

Sheet 3-3 Sheets.

Palmer & Williams.
Harvester Rake.

Nº 10,459.

Patented Jan. 24, 1854.

UNITED STATES PATENT OFFICE.

AARON PALMER, OF BROCKPORT, NEW YORK, AND STEPHEN G. WILLIAMS, OF JANESVILLE, WISCONSIN.

IMPROVEMENT IN GRAIN-HARVESTERS.

Specification forming part of Letters Patent No. 10,459, dated January 24, 1854.

*To all whom it may concern:*

Be it known that we, AARON PALMER, of Brockport, in the county of Monroe and State of New York, and STEPHEN G. WILLIAMS, of Janesville, in Rock county and State of Wisconsin, have invented a new and useful Improvement on the Harvesting-Machine or Reaper; and we do hereby declare that the following is a full and exact description thereof, reference being had to the accompanying drawings, making a part of this specification—

Figure I being a top view of the entire machine. Fig. II is a rear elevation, and Fig. III is an end elevation.

Similar letters indicate like parts in all the figures.

The frame of our harvesting-machine or reaper is composed of the front piece, A, the parallel piece B, and the end piece, C, and the transverse pieces D and E.

The driver's seat is composed of the pieces F F F F, crossing each other, so as to form an X, and the reel-bearers G G, on which, at H, is a board for a seat, and at I is the foot-board.

The reel is made with a shaft nearly five feet long, with one set of arms projecting from the middle and another set from one end of the shaft at right angles. To these arms are attached ribs $X^3$, running parallel with the shaft, and project beyond the end of the shaft nearly half their length, of which K is a top view of the reel. This reel has its bearings on the end of the reel-bearers at L L, and is parallel to the front piece, A, and revolves on its bearings by means of a bolt or chain connecting it with the hub of the main driving-wheel.

The main driving-wheel M of the machine is placed between the transverse pieces D and E, and between the front piece, A, and the end piece, C, of the frame, and has its bearings on the arch-supports N N arising from the transverse pieces D and E. On the side of the main driving-wheel is a bevel-gear meshing into the pinion O, which runs on the transverse crank-shaft P, which has its bearings on the arch-support, N at $R^2$, and in a box on the front piece at R. This pinion runs loose on the crank-shaft, but has a ratchet formed on the largest end, which receives a corresponding ratchet, which is connected to the shaft by a key or feather, and is slid out and into gear by the lever S.

T is a curved platform for receiving the stalks and heads of grain as they are severed by the cutting apparatus, and is in form a sector of a circle.

The cutting apparatus is on the front edge of a platform, and may be constructed in any well-known or usual manner, and is operated by the crank on the end of the crank-shaft P.

A straight guard is placed on the inner side of the platform, and is fastened to the platform near the driver's seat. The curved guard U arises from the outer edge of the platform T, to guide the grain as it is raked off.

V is the operating-lever, vibrating on the center of a circle of which the platform T forms a sector. At one end of this lever are attached two sets of the segments of a bevel-wheel, one on the lower and the other on the upper side of the lever, and one of which passes above and the other below one of the arch-supports N. The pin W passes through these segments and the arch-support N, and forms the fulcrum on which the lever turns. A corresponding set of bevel-wheels are placed on the shaft of the main driving-wheel, so as to mesh into these segments, and so arranged that as soon as one set of cogs cease to operate the other set commences, and thus carries the lever alternately backward and forward. The ratchet-ring Y is connected with the bevel-wheels Z by means of a key or feather, and slides freely backward and forward on their hub, and connects with a corresponding ratchet on the hub of the main driving-wheel, and is thrown in and out of gear by the person driving the team by means of the lever $a$, so as to regulate the size of the gavels, whether in heavy or light grain. $b\ b\ b$ is the rake and rake-frame, with the iron arm $c$ attached on one side and the joint $d$ formed by a hole in the arm at the other side. The operating-lever passes through the holes $a$ and $f$, allowing the rake-frame to operate freely on the lever. A mortise is made on the upper edge of the iron arm at $h$, into which the spring-latch falls when the rake-head is up. As the operating-lever is carried back the iron arm $c$ strikes the foot-piece $k$, and the rake-head is carried up sufficiently high to pass over the next bundle of grain. The latch falls into the mortise $h$, and holds it up as the rake is carried forward. The latch $p$ passes under the wedge $l$, and is raised out of the mortise when the rake-head falls. The teeth striking into tne fallen grain are held firmly down by the spring *m*, which causes an even pressure, whether the grain is heavy or light, in thick or thin layers, until it is drawn off the platform by the operation of the lever V, and so on alternately.

The lever V may be operated by a crank, or by a combination of levers, instead of the bevel-gear. It will be perceived that the grain is discharged from the platform in such a position as to be entirely out of the way of the horses which draw the machine during their succeeding tour around the field, and that any number of acres can be cut before any of it is obliged to be bound or removed.

We do not claim the discharging the cut stalks and heads of grain from a platform by means of the combination of a rake with a lever, and the co-operation therewith of a series of teeth on the face of the main driving-wheel, and an inclined rail rising above the guard of the platform, as these are already secured to us by Letters Patent bearing date July 1, 1851; but We do claim—

1. The method of transferring motion to the rake on the platform from the driving-wheel by means of the double-curved rack and pinion on the axle of the driving-wheel, the iron arm *c*, latch *p*, and spring *m*, as herein described.

2. The method of hanging the reel so as to dispense with any post or reel-bearer next to the standing grain, as herein described, thereby preventing the grain from getting caught and being held fast between the divider and a reel-supporter.

AARON PALMER.
STEPHEN G. WILLIAMS.

Witnesses:
JOSEPH GANSON,
FREDK. LANDON.